Sept. 15, 1970    J. J. DE MOYA ET AL    3,528,589
MATERIAL FEEDER CONSTRUCTION WITH RECIPROCATING VALVE ASSEMBLY
Filed July 25, 1968    3 Sheets-Sheet 1
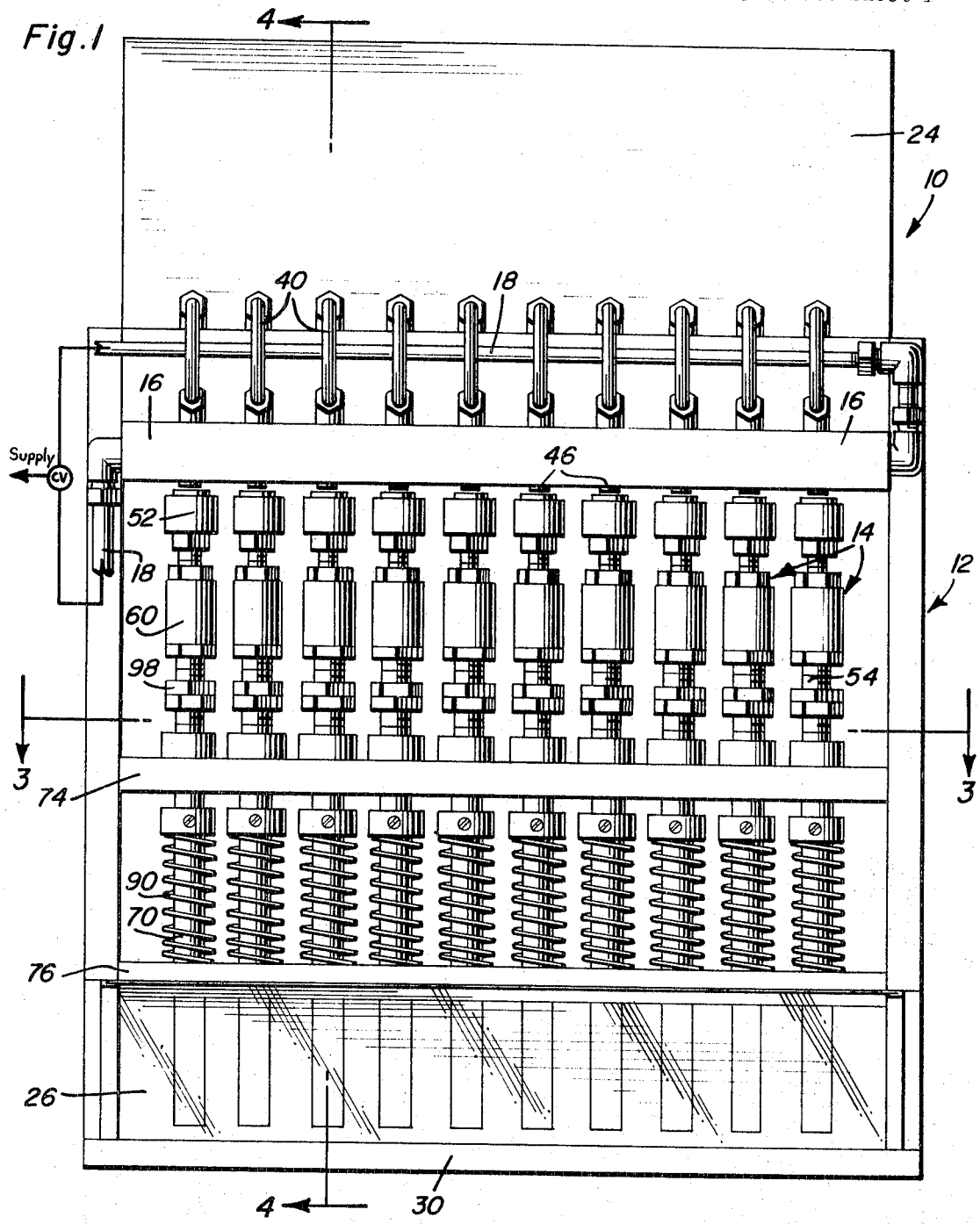
Jose J. de Moya
Miguel G. Moreira
INVENTORS
BY Clarence A. O'Brien
and Harvey B. Jacobson
Attorneys

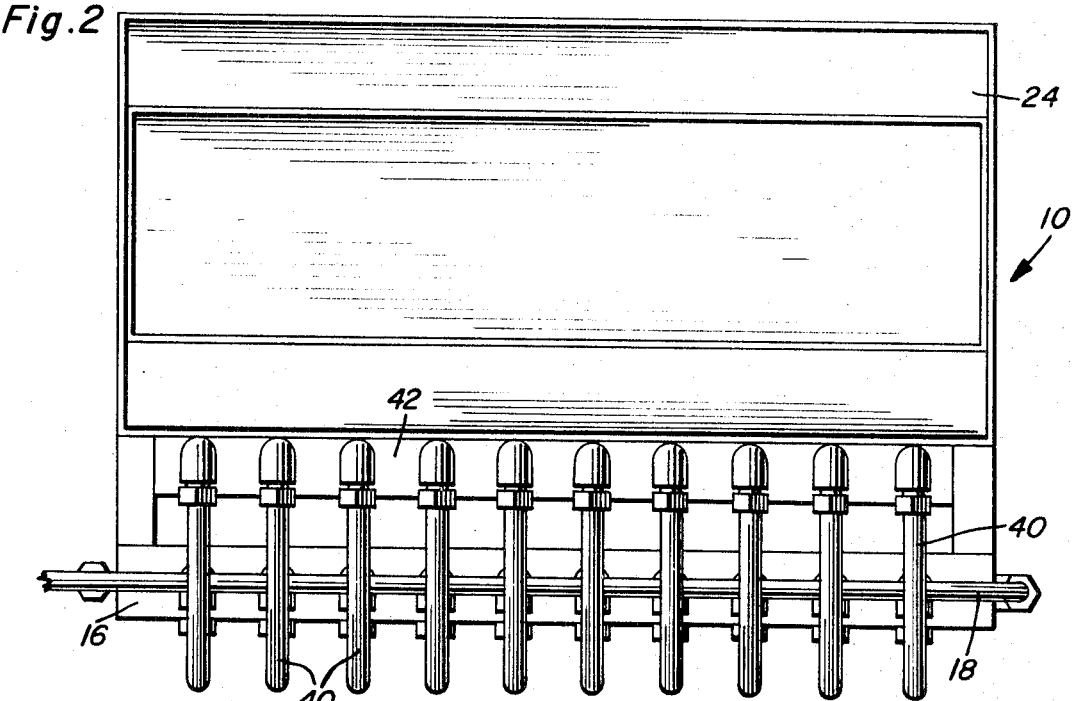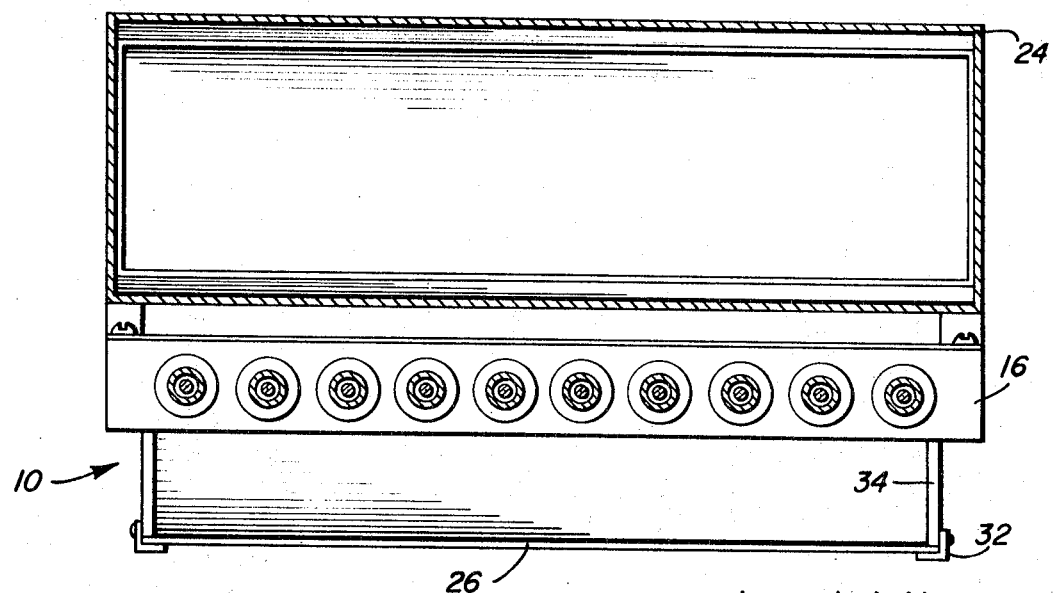

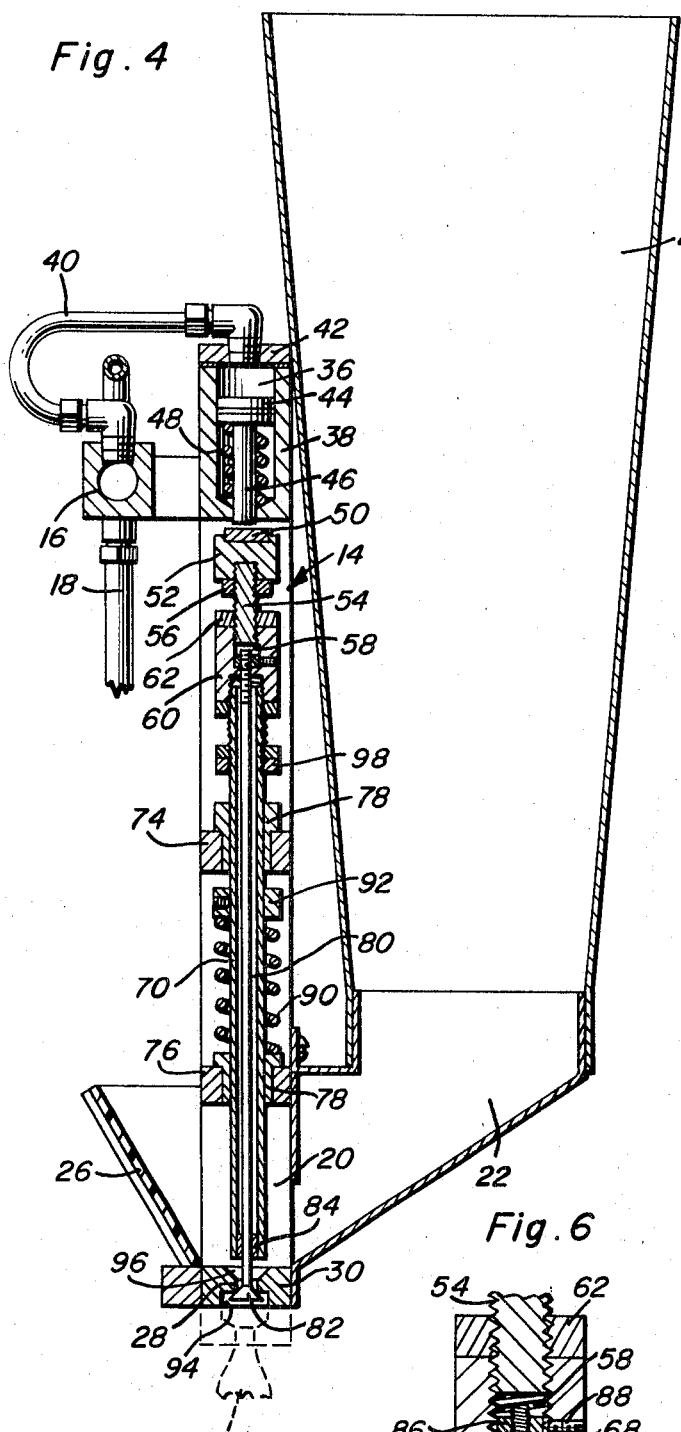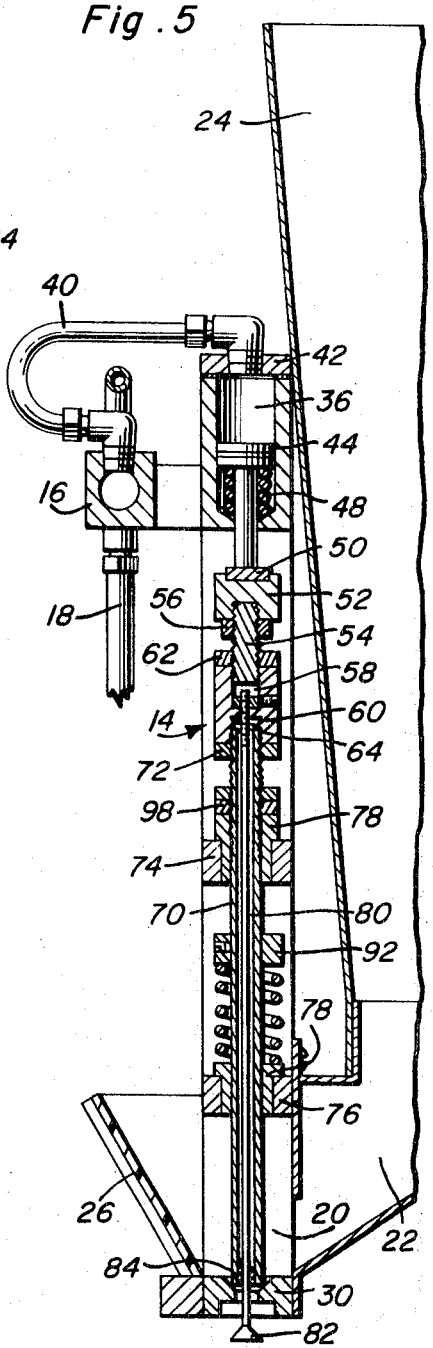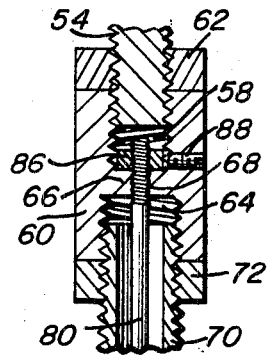

_United States Patent Office_

3,528,589
Patented Sept. 15, 1970

3,528,589
MATERIAL FEEDER CONSTRUCTION WITH RECIPROCATING VALVE ASSEMBLY
Jose J. de Moya, Linden, and Miguel G. Moreira, Parlin, N.J. (both of 210 Marion Ave., Linden, N.J. 07036)
Filed July 25, 1968, Ser. No. 747,621
Int. Cl. G01f *11/00*
U.S. Cl. 222—275                         11 Claims

ABSTRACT OF THE DISCLOSURE

A pneumatically controlled feeder head for packaging machines of the type utilized in packaging granulated, semi-granulated or powdered products in paper packages or flexible pouches. The feeder head includes multiple adjustable valve assemblies gravity fed from a common hopper and simultaneously pneumatically controlled through a manifold arrangement. Each of the valve assemblies is adjustable so as to control the volume of material dispensed at each cycle.

---

The instant invention is generally concerned with the packaging of flowable material, such as sugar, or the like, in sealed paper packages, and more particularly relates to a unique feeder head adaptable for use with a conventional packaging machine for the purpose of providing a means for effecting a positive volume controlled flow of the material to the actual package forming and sealing apparatus.

A significant object of the instant invention resides in the provision of a multiple valve assembly feeder head which is pneumatically controlled with the individual valve assemblies being adjustable so as to control the volume of material dispensed from a common product chamber.

Another significant object of the instant invention resides in the provision of multiple valve assemblies which are equally adaptable for use in both low and high speed operation, maintaining a constant flow of the product in a positive manner free from blockage and in a self-cleaning manner.

Basically, the feeder head includes a plurality of parallel feeder valve assemblies pneumatically controlled from a common overhead manifold for vertical reciprocation in a common hopper-fed product chamber. Each valve assembly includes vertically spaced upper and lower valves and operates through a discharge port, the valve being longitudinally adjustable relative to each other so as to vary the volumetric discharge. The two valves effect a positive engagement with the base plate through which the discharge opening is defined whereby a positive cut-off of the material is effected so as to insure an exact volumetric control even under high speed operational conditions.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a front elevational view of the feeder head of the instant invention;

FIG. 2 is a top plan view of the feeder head;

FIG. 3 is a horizontal cross-sectional view through the feeder head taken substantially on the plane passing along line 3—3 in FIG. 1;

FIG. 4 is a vertical cross-sectional view taken substantially on a plane passing along line 4—4 in FIG. 1 with the feeder valve assembly retracted;

FIG. 5 is a partial cross-sectional view similar to FIG. 4 with the valve assembly extended; and FIG. 6 is an enlarged cross-sectional detail through the adjusting means for the valve assembly.

Referring now more specifically to the drawings, reference numeral 10 is used to generally designate the multiple feeder head comprising the instant invention. The head 10, as indicated supra, is adapted for use with package forming apparatus of the type wherein paper or other flexible material sacks are provided for flowable granular or powdered material. The feeder head 10 is self-contained with the components thereof mounted on an appropriate rigid supporting framework 12.

With reference to FIGS. 1, 2 and 3, it will be noted that the feeder head 10 is in fact a multiple unit comprising a plurality of aligned vertically orientated valve assemblies 14 controlled from a common transversely extending manifold 16 pneumatically supplied, through air lines 18, at both ends thereof so as to insure an equalization of the pressure throughout the length of the manifold and a synchronized operation of all of the valve assemblies 14. The flow through the air lines 18 will be controlled from a common control valve electrically or otherwise automatically controlled for effecting the necessary periodic introduction and exhausting of the pressurized air, such of course being synchronized with the operation of the actual package forming portion of the apparatus with which the feeder head 10 is used.

A common elongated product chamber 20 surrounds the lower or dispensing end portions of the valve assemblies 14 and is in direct communication, through a laterally angled material directing passage 22, with an enlarged upwardly directed material hopper 24 bolted or otherwise affixed to the framework 12. The forward face of the product chamber 20 is provided with a clear plastic or glass panel 26 providing a clear view of the product chamber and the dispensing lower end portions of the valve assemblies 14. This forward wall or viewing panel 26 may be inclined outwardly so as to effectively enlarge the product chamber with the sloping of the wall thereof insuring a positive directing of the contained material or product toward a series of discharge ports 28 provided through an elongated base plate 30. The transparent front panel 26 will also preferably be removably mounted so as to provide for easy access to the product chamber and the lower end portions of the valve assemblies, for example by the provision of side retaining angles 32 releasably screwed to the opposed forwardly projecting side walls 34 which receive the front panel 26 therebetween.

Attention is now directed to FIGS. 4, 5 and 6 wherein a typical valve assembly 14 has been detailed. Each valve assembly 14 includes an air cylinder chamber 36 defined within an elongated cylinder block 38 which transversely spans the feeder head 10 and is mounted on the framework 12, this block 38 including an air chamber 36 defined therein for each valve assembly. Each chamber is communicated with the air manifold 16 through an air hose or line 40 coupled to both the manifold 16 and a top plate 42 overlying the cylinder block 38 and sealing the cylinder chambers 36 in an airtight manner.

A spring-loaded piston 44 is slidably mounted within each chamber 36 with the elongated piston rod 46 associated therewith projecting through the lower end of the block 38 for selective extension therebelow upon the introduction of pressurized air and retraction through the biasing force of the expanded coil compression spring 48 surrounding the piston rod 46 and bearing against the piston 44.

The piston rod 46, upon extension, engages against a bearing plate 50 set within the upper surface of a block or force receiving head 52. A threaded connecting rod 54 is threaded into the lower side of the block 52 and locked in position by an appropriate lock nut 56. The lower end of the rod 54 is in turn threadedly received within the upper end of an internally threaded passage 58 provided vertically through the upper portion of a vertically elongated block-like adjusting knob 60. An appropriate lock nut 62 is also used to fix the position of the threaded lower portion of the rod 54 within the block 60. The adjusting block 60 is also provided with an internally threaded passage extending vertically inward through the lower portion thereof, this passage, designated by reference numeral 64, is axially aligned with the threaded passage 58 and of a greater diameter, being separated from the passage 58 by a relatively thick partition wall 66 which in turn includes an internally threaded passage 68 therethrough of a substantially reduced diameter relative to both passages 58 and 64. The internally threaded lower passage 64 mounts an elongated guide tube 70, the upper portion of which is externally threaded for adjustable mounting within the passage 64. An appropriate lock nut 72 is also threaded on the upper threaded portion of the guide tube 70 for locking engagement against the adjusting block 60 upon an adjusted positioning of the guide tube relative thereto.

The guide tube 70 extends slidably through a pair of vertically spaced cross-rails 74 and 76, each provided with a tube accommodating bushing 78. The lower cross-rail 76 actually constitutes the top member of the product chamber 20 into which the guide tube 70 projects, terminating in spaced relation above the discharge port containing base plate 30.

Extending coaxially through the guide tube 70 is an elongated valve stem 80 terminating, at the lower end thereof, in a conical valve or valve head 82 positioned below the discharge port 28 through which the lower portion of the stem itself projects. The stem 80 is slidably sealed within the guide tube 70 by an appropriate bushing 84 received within the lower end of the guide tube 70 about the stem 80 with this sealed lower end of the guide tube 70 also functioning in the manner of a valve for cooperation with the valve 82 in a manner which shall be described subsequently. The upper end of the valve stem 80 is externally threaded and threadedly received through the internally threaded bore or passage 68 provided in the partition wall 66 within the adjusting blocks 60. An appropriate lock nut 86 is threaded on the extreme upper end of the valve stem 80, bearing upon the upper face of the partition wall 66. In addition, an appropriate setscrew 88 is engaged with the lock nut 86 through the side of the adjusting block 60 so as to fix the position of the valve stem 80 to the adjusting block 60 against relative rotation during an adjustment of the guide tube 70.

With reference to FIG. 5 in particular, the valve assembly 14 illustrated therein is in its retracted position which occurs upon a release of the pneumatic pressure. The piston rod 46 is retracted by means of the spring 48 with the remainder of the assembly similarly being retracted through the action of the expanded coil compression spring 90 engaged between an adjustable collar 92 locked by setscrew means to the guide tube 70 below the rail 74, and the lower product chamber forming rail 76. In this retracted position, the conical valve or valve head 82 seats against the lower extremity of the discharge port 28, received within a countersunk portion 94 within the base plate 30 if so desired. In this position, the material is of course retained within the product chamber 20 and flows about the valve stem 80 between the seated conical head 82 and the valve forming lower end of the guide tube 70, facilitated by the conical mouth 96 of the discharge port 28. Upon the introduction of pneumatic pressure, now noting FIG. 5, the piston rod 46 is extended and in turn effects a downward extension of the full valve assembly, limited by a pair of lock nuts 98 threaded on the threaded upper portion of the guide tube 70 and positioned for engagement with the rail 74 or the bushing 78 mounted thereon. This stop, defined by the nuts 98, is so orientated as to engage the valve forming lower end of the guide tube 70 in a seated manner within the conical mouth 96 of the discharge port 28 so as to effect a positive sealing thereof, thereby positively terminating the flow of material and providing an exact volumetric control for the dispersed material. As will be appreciated, the amount of material dispersed can be varied through a variation in the vertical gap between the lower end of the tube 70 and the conical valve head 82. This in turn is effected through the threaded engagement of the upper end of the tube 70 with the adjusting block 68 to which the valve stem 80 is positively locked. In order to effect this adjustment, the upper and lower lock nuts 62 and 72, engage with the upper and lower surfaces of the adjusting block 60 can be backed off and the appropriate adjustments made so as to vertically move the tubular guide 70 relative to the conical valve 82. By the same token, the desired adjustment can, if so desired, be effected by merely backing off the lower lock nut 72 and moving the guide 70 vertically relative to the adjusting block 60 through the threading or unthreading of the guide 70 relative to the block, after which the lower lock nut 72 is again engaged and the stop forming lock nuts 98 appropriately positioned.

In actual operation, the product to be packaged is introduced into the hopper 24 for feeding thereby into the product chamber 20. Each valve assembly, during the actual dispensing periodically vertically reciprocates to effect a positive discharge of a predetermined volume of the product within the product chamber. The sloping walls of the product chamber facilitate and encourage a positive movement of the product to the enlarged mouths 96 of the discharge ports 28 between the port sealing conical valve 82 and the valve defining lower and of the tubular guide 70. Upon an extension of the valve assembly, the lower end of the guide 70 effects a positive downward ejection of the material received between the two valves with the discharge of material terminating abruptly upon seating of the lower end of the guide against the seat therefor defined by the corresponding discharge port 28. The discharged material then flows through an appropriate feeder tube 100 or the like into the conventional packaging apparatus. Upon retraction of the valve assembly, the discharge port 28 is immediately sealed by the upward moving conical valve 82 with this movement being rapidly effected, through the return spring 90, before the material can again flow downward into the conical mouth of the corresponding discharge opening 28. The vertical movement of the valve assembly within the product chamber 20 itself, as well as the positive engagement of the two valve portions against the discharge port, act so as to provide a slight degree of agitation within the product chamber which significantly contributes to the free flow of the product and the avoidance of any blockage. Incidentally, it should be appreciated that while the feeder head has been illustrated as incorporating a plurality of valve assemblies, if so desired, in small operations, a single valve assembly 14 can be provided.

What is claimed as new is as follows:

1. A feeder head for feeding flowable material to a packaging machine or the like, said feeder head comprising a product chamber, at least one discharge port in said chamber, a reciprocating valve assembly slidably extending through said chamber in alignment with the discharge port, said valve assembly including a first valve located outward of said discharge port and selectively seatable thereagainst in a sealing manner upon movement of the valve assembly in a first inward direction, a second valve located in inwardly spaced relation to said first valve inward of said discharge port within the product chamber and selectively seatable against said discharge port in a sealing manner upon movement of the valve assembly in a second outward direction, the seating of said valves constituting the limits of movement of the valve assembly, the space between said first and second valves defining a predetermined volume of material to be moved through said discharge port upon an outward movement of said valve assembly from the seated position of the first valve to the seated position of the second valve, means for varying the spacing between the first and second valves and hence varying the volume of material moved through the discharge port thereby upon a movement between a seated position of the first valve and a seated position of the second valve, pneumatic means for moving said valve assembly in said first direction, and spring means for moving said valve assembly in said second direction, said spring means being operative upon a release of said pneumatic means, said valve assembly including an elongated tubular guide, framework means stabilizing and slidably supporting said tubular guide, the lower end portion of said tubular guide constituting said second valve.

2. The construction of claim 1 including an elongated valve stem affixed to said first valve and projecting therefrom longitudinally through said tubular guide, said means for varying the spacing between the first and second valves adjustably engaging the ends of said valve stem and said tubular guide opposed from said valves.

3. The construction of claim 2 wherein said means for varying the spacing between the first and second valves includes an adjusting block, a first enlarged internally threaded passage within said block, the corresponding end of said tubular guide being externally threaded and threadedly received in said threaded passage for adjustment therein, and a second internally threaded passage within said block communicating with the inner end of said first threaded passage, the corresponding end of the valve stem bieng externally threaded and threadedly received within the second internally threaded passage for adjustment therein.

4. The construction of claim 3 including an enlarged material receiving hopper in direct gravity feeding communication with said product chamber.

5. The constructon of claim 3 wherein said feeder head includes a plurality of duplicate reciprocating valve assemblies, said product chamber being common to all of said assemblies and incorporating a discharge port therein in association with each of said valve assemblies.

6. A feeder head for feeding flowable material to a packaging machine or the like, said feeder head comprising a product chamber, at least one discharge port in said chamber, a reciprocating valve assembly slidably extending through said chamber in alignment with the discharge port, said valve assembly including a first valve located outward of said discharge port and selectively seatable thereagainst in a sealing manner upon movement of the valve assembly in a first inward direction, a second valve located in inwardly spaced relation to said first valve inward of said discharge port within the product chamber and selectively seatable against said discharge port in a sealing manner upon a movement of the valve assembly in a second outwrd direction, the seating of said valves constituting the limits of movement of the valve assembly, the space between said first and second valves defining a predetermined volume of material to be moved through said discharge port upon an outward movement of said valve assembly from the seated position of the first valve to the seated position of the second valve, and means for varying the spacing between the first and second valves and hence varying the volume of material moved through the discharge port thereby upon a movement between a seated position of the first valve and a seated position of the second valve, said valve assembly including an elongated tubular guide, framework means stabilizing and slidably supporting said tubular guide, the lower end portion of said tubular guide constituting said second valve.

7. The construction of claim 6 including an elongated valve stem affixed to said first valve and projecting therefrom longitudinally through said tubular guide, said means for varying the spacing between the first and second valves adjustably engaging the ends of said valve stem and said tubular guide opposed from said valves.

8. The construction of claim 7 wherein said means for varying the spacing between the first and second valves includes and adjusting block, a first enlarged internally threaded passage within said block, the corresponding end of said tubular guide being externally threaded and threadedly received in said threaded passage for adjustment therein, and a second internally threaded passage within said block communicating with the inner end of said first threaded passage, the corresponding end of the valve stem being externally threaded and threadedly received within the second internally threaded passage for adjustment therein.

9. A feeder head for feeding flowable material to a packaging machine or the like comprising a product chamber, said product chamber including a top member and a bottom member, said top member having at least one aperture defined vertically therethrough, an elongated tube slidably received through said aperture, a discharge port defined in the lower member in alignment with said tube, the lower end of said tube defining a valve selectively seatable over said discharge port, an elongated valve stem extending through said tube and therebelow through said discharge port, a second valve on the lower end of said valve stem, said second valve being selectively seatable upward against discharge port, means engaging the upper ends of said valve stem and said tube for selectively locking the valve stem and tube, and hence the two valves, in a predetermined adjusted position relative to each other, the space between the two valves defining a predetermined volume to be discharged through the discharge port, and means for reciprocally moving the valve assembly so as to selectively unseat the second valve and seat the first valve, moving the volume of material positioned between the valves through the discharge port.

10. The construction of claim 9 wherein said means engaging the upper end of said valve stem and said tube does so adjustably so as to enable a selective varying of the space between the two valves and a corresponding varying of the volume to be discharged through the discharge port.

11. For use in regulating the flow of a flowable material through a discharge port in a product chamber for the feeding of such material to a packaging machine or the like, a valve assembly, said valve assembly including an elongated tubular member positionable within the product chamber with the lower end thereof in alignment with the discharge port, the lower end portion of said tubular member constituting a port sealing valve, an elongated valve stem extending longitudinally through said tubular member and projecting beyond the lower end thereof, said valve stem having a lower end portion positionable through the product chamber discharge port, and a second valve mounted on the lower end portion of said valve stem for a selective engagement with the discharge port, an adjusting block engaging the upper ends of said tubular member and said valve stem, the upper end portion of said tubular member and said valve stem being independently adjustable within said adjusting block relative to each other so as to enable a varying in the longitudinal spacing between the valves.

References Cited

UNITED STATES PATENTS

| 2,772,531 | 12/1956 | Brodsky | 222—453 X |
| 2,972,292 | 2/1961 | Waas et al. | 222—453 X |
| 3,101,159 | 8/1963 | Fletcher | 222—453 X |
| 3,101,161 | 8/1963 | Ivarson | 222—334 X |
| 3,228,563 | 1/1966 | Rankin et al. | 222—453 X |
| 3,242,990 | 3/1966 | Keaton | 222—453 X |

STANLEY H. TOLBERG, Primary Examiner

H. S. LANE, Assistant Examiner

U.S. Cl. X.R.

222—309, 334, 340, 409